S. REED.
Cultivators.
No. 157,761. Patented Dec. 15, 1874.
FIG. I.
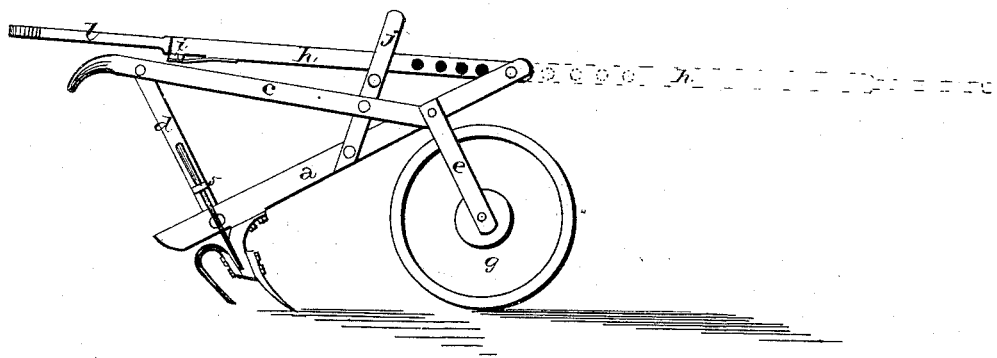
FIG. II.
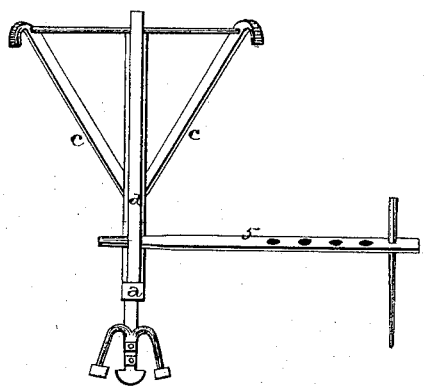
FIG. III.
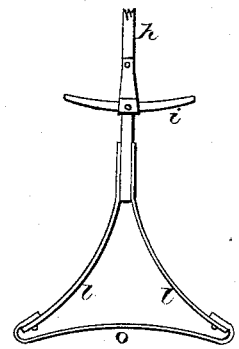
WITNESSES.
F. B. Townsend.
E. T. Kaiser.
INVENTOR.
Sam'l Reed
per
F. A. Lehmann, Atty.

UNITED STATES PATENT OFFICE.

SAMUEL REED, OF LIBERTY GROVE, MARYLAND.

IMPROVEMENT IN CULTIVATORS.

Specification forming part of Letters Patent No. 157,761, dated December 15, 1874; application filed June 24, 1874.

*To all whom it may concern:*

Be it known that I, SAMUEL REED, of Liberty Grove, in the county of Cecil and State of Maryland, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in garden cultivators to be operated by hand; and it consists in the arrangement and combination of devices, which will be more fully described hereafter, whereby a light cheap cultivator for garden use is produced, and which can be operated by hand or man power alone.

The accompanying drawings represent my invention.

$a$ represents an ordinary straight beam, to the sides of which the handles $c$ are secured and supported in position by means of the standard $d$. Extending downward from near the front end of the beam are two bars, $e$, in the lower ends of which is journaled the wheel $g$, which supports the front end of the beam. Either the bars $e$ should be made sufficiently long or the wheel large, as shown, so that the front end of the beam will be raised high above the rear end, for the purpose of raising the draft to the most advantageous position, and so that the cultivator shovels or plow will not have such a tendency to enter deeply into the soil. Pivoted in the front end of the beam is a long draft-bar, $h$, which has a series of holes made through its pivoted end, so that the bar can be adjusted back and forth, as circumstances may require. This bar is intended to project either straight out in front of the beam, and is provided with a hand-lever, $i$, so that the cultivator can be drawn forward, or the bar may be turned backward extending between the two guides $j$ back between the two handles, so that the force of the body of the operator may be applied to pushing the machine forward. Secured to the end of this bar are two springs, $l$, which curve outward, and have their outer ends connected together by means of a strap, $o$. In pushing the machine forward, the operator's body presses against the strap, and should the machine be suddenly stopped the springs prevent him from being jarred or hurt. Secured to the under side of the beam, near its rear end, is a short stout standard, to which a cultivator of any desired pattern, or a plow, may be bolted. Secured to the rear side of this standard, by the same bolts which fasten on the plow or cultivator, is a double-pronged fork, which may be used to cut vines and weeds, to stir the surface of the ground, to break the clods, and for other similar purposes. Projecting outward from the side of the standard which supports the handles is a bar, 5, having a series of holes made through its outer end, in which are stuck one or more sticks or markers for laying off the rows or furrows.

Having thus described my invention, I claim—

1. The combination of the beam $a$, handles $c$, wheel $g$, pivoted draft-bar $h$ provided with springs, and hand-lever and guides $j$, substantially as set forth.

2. A hand-cultivator having a beam and handles, and provided with a pivoted draft-bar, $h$, having the spring $l\ o$ and cross-bar $i$ and guide $j$, whereby the cultivator can be drawn or forced through the ground, substantially as shown and described.

In testimony that I claim the foregoing I have hereunto set my hand this 9th day of June, 1874.

SAMUEL REED.

Witnesses:
L. R. KIRK,
R. A. EVANS.